United States Patent

[11] 3,615,194

| [72] | Inventors | Allan K. Reed<br>Columbus;<br>William M. Goldberger, Bexley; David D.<br>Whyte, Wyoming, all of Ohio |
|---|---|---|
| [21] | Appl. No. | 860,776 |
| [22] | Filed | Sept. 24, 1969 |
| [45] | Patented | Oct. 26, 1971 |
| [73] | Assignee | The Procter & Gamble Company<br>Cincinnati, Ohio |

[54] PROCESS FOR THE PREPARATION OF AN ANHYDRIDE OF TRIVALENT PHOSPHORUS
16 Claims, 1 Drawing Fig.

[52] U.S. Cl............................................. 23/165,
204/157.1, 204/164
[51] Int. Cl........................................C01b 25/12,
C01b 25/16

[50] Field of Search............................................. 23/165 A,
202; 204/164, 157.1 H

[56] References Cited
UNITED STATES PATENTS

| 3,443,897 | 5/1969 | Wilson .......................... | 23/165 X |
| 3,532,461 | 10/1970 | Whyte et al.................... | 23/165 |

*Primary Examiner*—Oscar R. Vertiz
*Assistant Examiner*—Gregory A. Heller
*Attorney*—Julius P. Filcik ABSTRACT: A process for the preparation of an anhydride of trivalent phosphorus wherein an anhydride of pentavalent phosphorus is reduced by carbon monoxide in a DC plasma flame is disclosed. The anhydride of trivalent phosphorus is useful as an intermediate in the preparation of detergency builders for use in detergent compositions.

PATENTED OCT 26 1971
3,615,194
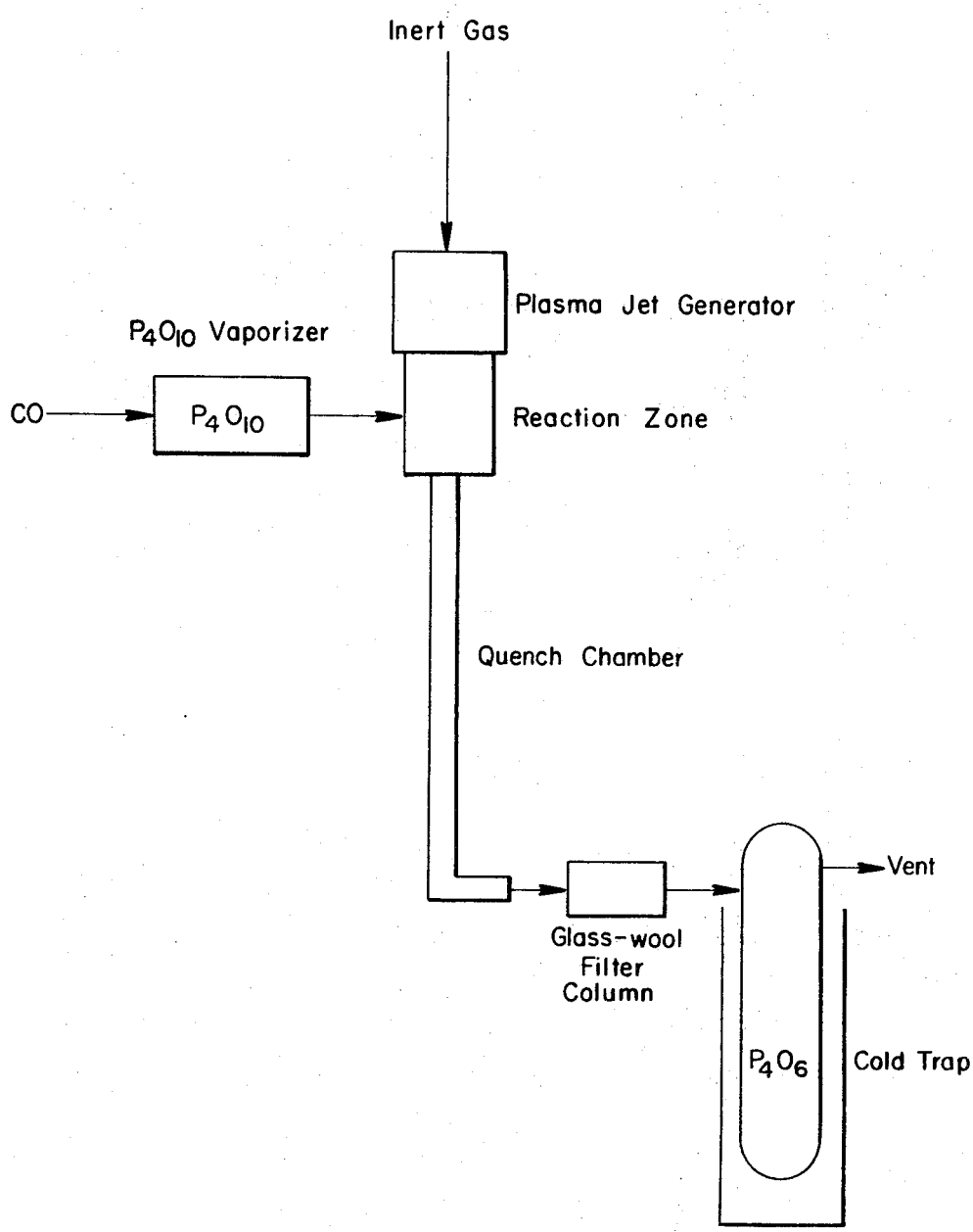
INVENTORS
Allan K. Reed
William M. Goldberger
David D. Whyte
BY
Stephen R. Smith
ATTORNEYS

PROCESS FOR THE PREPARATION OF AN ANHYDRIDE OF TRIVALENT PHOSPHORUS

FIELD OF THE INVENTION

This invention relates to a process for the preparation of phosphorus compounds. More particularly this invention relates to a process for the preparation of an anhydride of trivalent phosphorus from an anhydride of pentavalent phosphorus. This invention also relates to a process for the preparation of an anhydride of trivalent phosphorus from an anhydride of pentavalent phosphorus in which the anhydride of trivalent phosphorus is obtained in an essentially pure form and in a high yield.

BACKGROUND OF THE INVENTION

The anhydride of trivalent phosphorus, phosphorus trioxide, has not previously been prepared on a commercial scale. A known laboratory method of method of preparing phosphorus trioxide by burning phosphorus in oxygen is described by Wolf and Schmager in Chem. Ber., 62, 771–786 (1929). A method is also disclosed by Heinz and Thilo (German democratic Republic Pat. No. 26,660) in which phosphorus trioxide is prepared using $N_2O$. The yield of phosphorus trioxide obtained by the procedure of Wolf et al., supra, rarely exceeds about 50 percent and is usually substantially less than that amount. In addition using the procedure described by Wolf et al. byproducts consisting largely of $P_4O_{10}$, red phosphorus and the like are formed in large quantities. The method of Hines and Trillo gives yields of about 40 percent to 50 percent phosphorus trioxide.

A process for the preparation of phosphorus trioxide is disclosed in the copending application of David D. Whyte, Phillip F. Pflaumer, and Thomas S. Roberts, Ser. No. 566,482, filed July 20, 1966, now Pat. No. 3,532,461 for Process for Preparing Chemical Compounds Containing Trivalent Phosphorus. This process comprises reacting elemental phosphorus, oxygen, and at least one carbon oxide at a temperature in excess of about 1,500° C. until substantially complete equilibrium is achieved. This process is an improvement in the art of producing trivalent phosphorus compounds and the yields of trivalent phosphorus compounds are higher than those previously obtained in the art. This process provides a method for preparing a composition of matter comprising essentially anhydrides of trivalent phosphorus, and a method of preparing other trivalent phosphorus compounds, such as ehtane-1-hydroxy-1,1-diphosphonic acid and phosphorus acid.

A process for the preparation of an anhydride of trivalent phosphorus using excited helium is also disclosed in the copending patent application of Eugene J. Mezey, Ser. No. 861,145, filed Sept. 25, 1969, for Process for the Preparation of an Anhydride of Trivalent Phosphorus using Excited Helium, filed concurrently herewith.

The preparation of compounds in which the phosphorus atom exists in a +3 oxidation state has been rendered difficult, in part, by the complex nature of the phosphorus atom. The phosphorus atom can exist in compounds in which the oxidation state of the phosphorus atom ranges from −3, as in phosphine ($PH_3$), to +5, as in phosphoric acid ($H_3PO_4$), pyrophosphoric acid ($H_4P_2O_7$), phosphate salts ($M_3PO_4$), and metaphosphate salts ($MPO_3$). Compounds in which the phosphorus atom exists in an oxidation state intermediate between −3 and +5 are also known, e.g., phosphorus monoxide ($P_2O$), phosphite salts ($M_3PO_3$), hypophosphoric acid ($H_4P_2O$), and the like. Thus, methods of preparing phosphorus compounds having a particular oxidation state intermediate between −3 and +5 are either quite specific and do not result in high yields of the desired product or are contaminated with byproducts because of the ease with which phosphorus compounds having oxidation states other than the desired intermediate oxidation state can be prepared.

Accordingly, it is an object of the invention to prepare an anhydride of trivalent phosphorus in which the yields obtained are higher than those obtainable in other processes known in the art for preparing anhydrides of trivalent phosphorus.

In addition, it is object of this invention to prepare an anhydride of trivalent phosphorus in essentially pure form.

Also, it is an object of this invention to convert a known and commonly obtainable anhydride of pentavalent phosphorus into a valuable and useful anhydride of trivalent phosphorus. The anhydride of trivalent phosphorus is a valuable intermediate in the preparation of detergency builders for use in detergent compositions. For example, the anhydride of trivalent phosphorus can be used in the preparation of ehane-1-hydroxy-1,1-diphosphonic acid and its salts, which are valuable builders for use in detergent compositions as described by Frances L. Diehl in U.S. Pat. No. 3,159,581, patented Dec. 1, 1964. In addition the anhydride of trivalent phosphorus is useful in the preparation of phosphorus acid of known utility simply by mixing the anhydride of trivalent phosphorus with water.

Additionally, it is an object of this invention to provide a process for the preparation of an anhydride of trivalent phosphorus from an anhydride of pentavalent phosphorus and carbon monoxide, both of which are well-known and commonly available starting materials, using an extremely modern technological approach and a heretofore-unknown process.

SUMMARY OF THE INVENTION

The objects of this invention are achieved according to the process described herein. This heretofore-unknown process comprises the reaction of an anhydride of pentavalent phosphorus with carbon monoxide, as a reductant, at a temperature of from 1,500° K. to 20,000° K. This new and novel process allows the reaction products to be obtained rapidly, efficiently and in essentially pure form.

More specifically, the process of this invention for the preparation of an anhydride of trivalent phosphorus comprises passing an anhydride of pentavalent phosphorus and carbon monoxide through a reaction zone heated with an inert gas plasma flame to a temperature of from 1,500° K. to 20,000° K. and into a reaction quench chamber at a temperature of less than 800° K., said inert gas being selected from the group consisting of argon and helium.

In the process described herein, an anhydride of trivalent phosphorus is produced. As used herein, the term anhydride of trivalent phosphorus and the term phosphorus trioxide are intended to encompass $P_4O_6$, $P_2O_3$ (historically and conventionally used as the formula for phosphorus trioxide), and ($P_2O_3$). Hereinafter the terms, anhydride of trivalent phosphorus, phosphorus trioxide, $P_2O_3$, and $P_4O_6$, are used interchangeably. Similarly the use of the term anhydride of pentavalent phosphorus is intended to encompass both of the following chemical formulas, $P_2O_5$ (historically and conventionally used as the formula for phosphorus pentoxide) and $P_4O_{10}$ as well as mixed oxides of phosphorus, e.g., $P_4O_8$, containing $P_4O_{10}$, and the designation, phosphorous pentoxide. Hereinafter anhydride of pentavalent phosphorus, pentoxide, $P_2O_5$, and $P_4O_{10}$ are used interchangeably.

DETAILED DESCRIPTION OF THE INVENTION

The process described above whereby phosphorus trioxide is produced from phosphorus pentoxide comprises passing an anhydride of pentavalent phosphorus and carbon monoxide through a reaction zone heated with an inert gas plasma flame to a temperature of from 1,500° to 20,000° K. and into a reaction quench chamber at a temperature of less than 800° K., said inert gas being selected from the group consisting of argon and helium.

The process of this invention for the production of an anhydride of trivalent phosphorus from an anhydride of pentavalent phosphorus can be summarized schematically by the following overall equation:

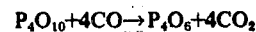

and involves the reduction of $P_4O_{10}$ with CO to provide phosphorus trioxide, $P_{O6}$, with the production of $CO_2$ as a byproduct.

The reactants involved in this process are commercially available or can be generated by conventional and well-known techniques. For example, $P_4O_{10}$ is available commercially or can be obtained by burning phosphorus in an excess of oxygen. Carbon monoxide can be prepared in a number of ways, e.g., by burning carbon in the presence of oxygen in the appropriate molar ratio or by the catalytic oxidation of methane. Argon and helium for use in generating the plasma flame are also commercially available.

In the process of this invention the reactants in a molar ratio of phosphorus pentoxide to carbon monoxide of 1:4 to 1:30, preferably 1:4 to 1:10, are passed as a vaporous mixture through a reaction zone at a a temperature of from 1,500° to 20,000° K. Where desired the reactants can be introduced into the reaction zone separately and mixed within the reaction zone.

The term reaction zone is used herein to describe the area in which phosphorus pentoxide and carbon monoxide are subjected to a temperature of 1,500° to 20,000° K. Any vessel, chamber, or container of any configuration or design is suitable for use as the reaction zone in the process of this invention. All that is necessary for the operation of the process of this invention is that the reaction zone be designed such that the reactants can be passed through the reaction zone and into the quench chamber and such that the reaction zone can be heated to the above-described temperatures by the inert gas plasma flame. A suitable reaction zone is a cylindrical chamber through which vaporous phosphorus pentoxide and carbon monoxide can be passed and in which the inert gas plasma flame can be generated and sustained. Based on the disclosure given herein, a reaction zone can be constructed of a suitable design design and from appropriate materials to accomplish the objects of this invention.

The temperature of from 1,500° to 20,000° K. used in the reaction zone for conducting the process of this invention are generated using an inert gas plasma flame. Plasma flames and their characteristics are described by Melvin B. Gottlieb, International Science and Technology, pp. 44–50, Aug. 1965. The inert gas plasma flame necessary to provide the above-described temperatures in the reaction zone can be produced using a conventional plasma-jet reactor.

A conventional plasma-jet reactor can be used to produce an inert gas plasma flame to provide temperatures in the reaction zone of from 1,500° to about 20,000° K. In a conventional plasma-jet reactor an inert fluid, e.g., an inert gas such as argon or helium, is passed between a cathode and an anode across which a direct current potential is applied. Application of a direct current to the cathode and anode creates a potential gradient. Upon discharge, an electric arc passes between the two electrodes and through the inert gas. The electric arc resulting from the discharge of current heats the inert gas present to a very high temperature. While not desiring to be bound by theory, passage of the electric arc through the inert gas results in an ionization of some of the atoms of the inert gas producing free electrons and positively charged nuclei. The ionization of the gas thereby increases the conductivity of the gas permitting the current to pass more easily between the electrodes resulting in the ionization of a great number of atoms of the inert gas. Eventually a flow-stabilized steady state is created resulting in the formation of a DC arc plasma flame of a sufficiently high temperature to provide temperatures in the reaction zone of from 1,500° to 20,000° K. The plasma flame so created provides the temperatures required in the reaction zone for the process of this invention. Although the plasma flame created is relatively small and confined to a small area, the plasma flame can be utilized to provide temperatures in the reaction zone not achieved by other means. At the temperatures achievable with a plasma flame, species such as $P_4O_{10}$ and CO, which would be unreactive at temperatures normally attainable using conventional technology, can be caused to react at the temperatures generated with a plasma flame.

The technology of plasma flames and the production of plasma flames using a DC plasma-jet reactor to generate high temperatures is relatively new having been described in the literature only in the past several years. A number of articles on generating a plasma flame and on plasma technology are available in which plasma flames are used to achieve chemical syntheses not possible by conventional means or typically chemical techniques. The plasma flame and the plasma-jet reactor with their characteristics and their uses are described in the following: Hans W. Leutner and Charles S. Stokes, Industrial & Engineering Chemistry, 53, pp. 341–342 (May, 1961); Hans W. Leutner, I&EC Process Design and Development, 1, pp. 166–168 (July, 1962); Charles S. Stokes, Chemical Engineering, pp. 191–194, 196 (Apr., 1965); Masao Sugawara et al., U.S. Pat. No. 3,192,427, patented June 29, 1965, for Plasma Flame Generator; C. A. Papp, Chemical Engineering Progress, 59, pp. 51–53 (June, 1963); C. S. Stokes and W. W. Knipe, Industrial & Engineering Chemistry, 52, pp. 287–288 (Apr., 1969); Thomas B. Reed, International Science and Technology, pp. 42–48, 76 (June, 1962); and Industrial and Engineering Chemistry 55, pp. 16–23 (Jan., 1963).

The plasma flame used in the process of this invention is generated in the plasma jet-generator by applying a direct current potential across an anode and a cathode through which the inert gas is passed. The selection of the material used in constructing the cathode and anode is not a critical consideration in generating the plasma flame. Suitable materials for constructing the cathodes and anodes are any of the electrically conductive metals having high melting points such as tungsten, thoriated tungsten, and graphite. Lower melting point electrically conductive metals such as copper are also suitable if provision is made for continuous cooling of the electrodes. Tungsten and thoriated tungsten are preferred cathode materials and water-cooled copper is preferred as the anode material.

In one embodiment of the process of this invention the electrodes comprise a cylindrical water-cooled copper anode with a water-cooled tungsten cathode rod centered within the anode. The inert gas is passed between the anode rod inserted within the cathode cylinder. The electrodes, i.e., the cathode and anode, are generally from 0.1 centimeter to 100 centimeters apart. The size of the electrodes and the electrode separation are not critical considerations and will be dependent upon the size of the equipment and the voltage applied. A DC electric potential sufficient to create the electric arc can be applied to the electrodes by methods well known in the art and any source of direct current is suitable. Voltages of from 10 volts to 1,000 volts, preferably from 20 volts to 500 volts, providing a voltage gradient of from about 50 volts per centimeter to about 1,000 volts per centimeter of electrode gap is suitable for generating the electric arc necessary to sustain the plasma flame.

In generating the plasma flame for use in the process of this invention the inert gas is passed through the plasma-jet generator. The gas is usually passed into the plasma-jet generator generating a pressure in the reaction zone of from 0.5 atmospheres to 100 atmospheres. A pressure of about 1 atmosphere or just slightly above (e.g., from about 1.0 to 1.2 atmospheres) is generally used. The inert gas used is passed into the plasma-jet generator and through the reaction zone generally at a flow rate of from 50 to 1,000, preferably from 100 to 500 standard cubic feet per minute per square foot (scfmf) of reaction zone cross-sectional area. The gas pressure and gas flow rate through the reaction zone can be monitored and controlled using conventional pressure gauges, flowmeters and valve systems.

Passing of the inert gas through the reaction zone at the above flow rates and at the above-described pressures and concurrently generating the electric arc will cause the formation of the plasma flame. The plasma flame usually is somewhat elongated due to the flow of the gas through the electrodes forming the plasma-jet. The jet can be additionally constricted where desired by passing the plasma forming gas through a constriction nozzle in the reaction zone. By constricting the flame to a smaller volume, higher temperatures are generated facilitating the production in the reaction zone of the temperatures used in the process of this invention. Where desired the plasma flame can be passed through a constriction nozzle and directed in a particular manner, as for example, where it is desired that the plasma flame be generated outside of the reaction zone and subsequently directed into the reaction zone to provide the temperatures used in the reaction zone. In addition, where desired the constriction nozzle can be used for mixing the reactants and for constricting the plasma flame, as for example, where the reactants and the plasma-forming gas are passed through the constriction nozzle in the reaction zone. Constriction of plasma flames is described by G. R, Kubanek et al., Can. J. Chem. Eng., 45, 251–257 (1967).

The temperatures generated in the reaction zone by the plasma flame can range from 1,500° to 20,000° K., preferably from 3,000° to 12,000° K. These temperatures in the reaction zone are used to operate the process of this invention. Within this temperature range the temperature of operation is not critical. Use of the above-described temperatures permits the rapid establishment of an equilibrium between the reactants and products. Use of temperatures below 1,500° K. results in poor yields. Higher temperatures than 20,000° K. are generally not required and necessitate the use of equipment which is compatible with these higher temperatures.

In the process of this invention, the temperatures in the reaction zone are sufficient to cause a reaction between the starting materials, the anhydride of pentavalent phosphorus and carbon monoxide, to obtain the products, the anhydride of trivalent phosphorus and carbon dioxide. The reverse reaction also occurs at these temperatures in which the starting materials are reformed. An equilibrium is established in which the rate of formation of the products equals the rate of formation of the reactants. The equilibrium between reactants and products is established quickly and efficiently in the process of this invention due to the use of the above-described temperatures in the reaction zone. A better understanding of the process of this invention can be obtained upon considering the following. While not desiring to be bound by theory, it is believed that the oxygen-phosphorus bonds in the anhydride of pentavalent phosphorus are disrupted resulting in the formation of an anhydride of trivalent phosphorus and free oxygen. The free oxygen so formed is then "trapped" by reaction with the carbon monoxide present to form carbon dioxide. At the temperatures of the reaction zone the reverse reaction can also take place with the carbon dioxide being dissociated into carbon monoxide and free oxygen with the free oxygen causing an oxidation of some of the anhydride of trivalent phosphorus back to the starting material. Although the above discussion has been described for the sake of simplicity as a stepwise process both forward to form the products and reverse to form the reactants, at the temperatures in the reaction zone used in the process of this invention the establishment of an equilibrium between the rate of formation of the products and the rate of formation of the reactants is essentially instantaneous. The products of the process of this invention are obtained by quenching the equilibrium established by passing the gases in the reaction zone into a quench chamber at a considerably lower temperature than is used in the reaction zone. By lowering the temperature quickly the reverse reaction, i.e., the reversion of the products to starting materials is minimized. The temperatures used in the reaction zone followed by a quick quenching step permit the formation of the anhydride of trivalent phosphorus efficiently, in high yields and in essentially pure form.

The time necessary for equilibrium between reactants and products to be achieved in the reaction zone before the gases from the reaction zone pass into the quench chamber is normally quite short since at the high temperatures of the reaction zone equilibrium between reactants and products is achieved essentially instantaneously. The residence time in the reaction zone necessary to achieve equilibrium will generally be from 0.5 milliseconds to 5 milliseconds, more normally from 1 millisecond to 3 milliseconds.

Subsequent to the reaction of the starting materials in the reaction zone is the cooling of the products in the quench chamber to prevent reversion of the products to starting material. The equilibrium is quenched by passing the gases from the reaction zone into a quenching chamber at a temperature of less than 800° K., preferably less than 500° K. Cooling the effluent gases from the reaction zone in the quench chamber freezes the equilibrium preventing the reformation of reactants. It will be appreciated that a temperature gradient necessarily must exist in the quench chamber because the temperature of the gas at the exit from the reaction zone are higher than the temperature of the gas exiting from the quench chamber. The temperatures described above for operation of the quench chamber are the average temperatures to be achieved in the quench chamber to obtain the objects of the process of this invention.

The determination of the optimum conditions for operation of the process of this invention for a specific set of reaction conditions, e.g., reactant flow rate, reaction zone temperature, reactant feed ratios, quench chamber temperature and plasma-forming gas flow rate can be accomplished by analysis of the reaction products obtained, for example, by analyzing the gases from the quench chamber for the amount of carbon dioxide present, and making the appropriate adjustments. For example, where the amount of carbon dioxide is low, the amount of phosphorus trioxide is low and a higher reaction zone temperature or a higher carbon monoxide/phosphorus pentoxide feed ratio can be used to permit the formation of more phosphorus trioxide.

To obtain the advantages of the process of this invention, the gases from the reaction zone are quickly cooled in a quench chamber to a temperature of below 800° K. within less than 3 seconds, preferably less than 1 second, to obtain the products of the process of this invention efficiently and in high yield. Once the gases are cooled to below this temperature the equilibrium between reactants and products is frozen and essentially no additional reaction occurs to form the products or to reform the reactants. The gasses in the quench chamber can then be separated using conventional techniques to obtain the products. Any unreacted starting material can be recycled through the reaction zone to increase the yield of the anhydride of trivalent phosphorus and to improve the economics of the process of this invention.

The quenching chamber used to cool the effluent gases emerging from the reaction zone can be of any construction or design. All that is necessary is that the quenching chamber cool the gases from the reaction zone quickly to a temperature of less than 800° K. and preferably less than 500° K. to "freeze" the equilibrium and obtain the reaction product. The quenching chamber can be cooled using jackets through which refrigerants, water, air and the like are passed. Suitable quench chambers can be designed or selected by one skilled in the art to achieve the cooling of the effluent gases to below temperatures above specified without departing from the spirit and scope of this invention. Where desired the gases can be cooled in the quench chamber by spraying the gases with water to form phosphorus acid and the phosphorus trioxide recovered by evaporating the water. Use of an acetic acid spray to cool the gases from the reaction zone is described hereinafter.

Once the gases have been cooled in the quench chamber the products of the process are simply separated from the reactants. The anydride of trivalent phosphorus vapor in the cooled gases from the quench chamber can be separated from the carbon dioxide reaction product and any unreacted anhydride of pentavalent phosphorus and carbon monoxide according to the procedure described hereinafter. In cooling the gases in the quench chamber to a temperature of below 800° K., any unreacted phosphorus pentoxide solidifies out at the temperatures used in quenching the effluent gases and can be separated and recovered, e.g. by passing the effluent gases through a filtration medium such as glass wool to remove any solid materials such as unreacted anhydride of pentavalent phosphorus. The gases are then bubbled through water, the anhydride of trivalent phosphorus recovered as phosphorus acid. The water can be then evaporated and the anhydride of trivalent phosphorus recovered. Any unreacted anhydride of pentavalent phosphorus filtered out by the glass wool trap can be recycled as a starting material where desired. In some instances, elemental phosphorus can be formed in small amounts by the complete reduction of phosphorus pentoxide. the elemental phosphorus will solidify at the temperatures used in the quench chamber and can be filtered out using a filtration medium and separated from the anhydride of pentavalent phosphorus by conventional and well-known techniques. The elemental phosphorus so formed can be used to prepare phosphorus pentoxide, e.g., by burning the phosphorus in oxygen, and using the phosphorus pentoxide formed as a starting material in this process.

A preferred separation technique is to pass the effluent gases from the quench chamber through the glass wool filter and subsequently through a cold trap, e.g., any container cooled to a temperature of below 400° K., preferably below 300° K., where the phosphorus trioxide product is separated from the inert gas and from any unreacted carbon monoxide or carbon dioxide produced. The anhydride of trivalent phosphorus produced by the process of this invention, separated, and collected as above, is obtained in a high yield, e.g., 70 percent or more, and essentially pure, e.g., 95–100 percent.

Reference is mode to the attached drawing in which one embodiment of the process of this invention is described. An inert gas plasma flame for heating the reaction zone is generated by passing an inert gas through a plasma-jet generator. Carbon monoxide is swept through a phosphorus pentoxide vaporizer, wherein phosphorus pentoxide is vaporized, and phosphorus pentoxide is entrained in the stream of carbon monoxide. The mixture of carbon monoxide and vaporus phosphorus pentoxide is passed through the reaction zone into a quench chamber wherein the effluent gases from the reaction zone are cooled. The phosphorus trioxide formed as the product of the process is separated from the other products, the inert gas, and any unreacted carbon monoxide and phosphorus pentoxide by passing the gases from the quench chamber through a glass wool filter column to separate out any solid materials, such as $P_4O_{10}$ and elemental phosphorus, and through a cold trap cooled with a dry-ice/acetone slurry to condense out the phosphorus trioxide from any unreacted carbon monoxide and the carbon dioxide and the inert gas. The inert gas, carbon monoxide and carbon dioxide are then vented from the system.

In summary, in the process of this invention an inert plasma flame is formed for heating the reaction zone to temperatures of from 1,500° to 20,000° K. Phosphorus pentoxide and carbon monoxide are then passed through the reaction zone and into the quench chamber. At the temperatures of the reaction zone the carbon monoxide and phosphorus pentoxide react to form phosphorus trioxide and carbon dioxide. The gases from the reaction zone containing the starting materials and products are cooled by passing the gases from the reaction zone into a quenching chamber at a temperature of below 800° K. The products are then simply separated. Where desired the anhydride of trivalent phosphorus can be additionally purified, e.g., by distillation.

The product of the process of this invention, phosphorus trioxide, is valuable as an intermediate in the preparation of known builders for use in detergent compositions (see Diehl, supra). For example, ethane-1-hydroxy-1,1-diphosphonic acid, and the salts thereof, can be prepared from the phosphorus trioxide obtainable from the process of this invention.

One method of preparing ethane-1-hydroxy-1,1-diphosphonic acid is described hereinafter. The gas from the reaction zone containing the phosphorus trioxide can be passed through a quenching chamber in which quenching of the equilibrium mixture is accomplished by spraying the gases containing the reaction product with acetic acid. An acetic acid spray or a series of such sprays not only provides the quenching step necessary to "freeze" the equilibrium but also leads to the formation of ethane-1-hydroxy-1,1-diphosphonic acid. Preparing ethane-1-hydroxy-1,1-diphosphonic acid from a gas stream containing phosphorus trioxide using an acetic acid spray is described by David D. Whyte, Phillip F. Pflaumer and Thomas S. Roberts, a copending application, Ser. No. 556,482, filed July 20, 1966, for Process for Preparing Chemical Compounds Containing Trivalent Phosphorus. In the disclosure therein anhydrides of trivalent phosphorus are recovered by scrubbing an effluent gas obtained from the burning of phosphorus in oxygen in the presence of an oxide of carbon. The phosphorus trioxide is removed from the gas using a conventional packed tower containing acetic acid.

The major proportion of the reaction product between the acetic acid and the anhydride of trivalent phosphorus, $P_4O_6$, is ehtane-1-hydroxy-1,1-diphosphonic acid or condensates thereof which can be readily converted to free acid. The molar proportions of the acetic acid to the anhydride of trivalent phosphorus used is from about 0.75:1 to about 50:1 and more preferably, from about 2:1 to about 20:1.

Because the reaction time between the acetic acid and the anhydrides of trivalent phosphorus is limited since the quenching is short, the reaction product comprises a substantial proportion of precursors of ethane-1-hydroxy-1,1-diphosphonic acid, such as acetylated phosphite compounds. A digestion step is used to convert these precursors to ethane-1-1,1-diphosphonic acid. In the digestion step the acetic acid/anhydride of trivalent phosphorus reaction product mixture is maintained at a temperature of from about 70° to about 170° C., for from 1 minute to 4 hours. The digested reaction product is then hydrolyzed by the addition of water to the reaction mixture to form a hydrolyzed solution containing free ethane-1-hydroxy-1,1-diphosphonic acid and acetic acid. Following the hydrolysis reaction, the hydrolyzed reaction product contains the desired ethane-1-hydroxy-1,1-diphosphonic acid.

Separation and recovery of the ethane-1-hydroxy-1,1-diphosphonic acid can be in any manner. If the hydrolysis is performed so that the hydrolyzed material contains only a small amount of water, e.g., 1 percent or less, the mixture can be cooled to a temperature in the range of 10° to 50° C., typically about 30° C., while being gently stirred. The ethane-1-hydroxy-1,1diphosphonic acid begins to crystallize as the hydrolyzed mixture cools. At about 30° C. the crystal formation requires 1 to 2 hours. Seeding of the mixture can be used to shorten the time necessary for crystallization. The crystallized acid can then be recovered by filtration and neutralized by reaction with a suitable base, such sodium hydroxide, to form the salt of ehtane-1-hydroxy-1,1-diphosphonic acid. The procedure described by Whyte al., supra, is suitable for the production of ethane-1-hydroxy-1,1-diphosphonic acid or its salts from the phosphorus trioxide in the effluent gas of the process of this invention.

The process of this invention provides a feasible and a useful method for preparing phosphorus trioxide, valuable as an intermediate in the formation of detergency builders for use in detergent compositions, on a continuous basis. The previously known methods give a product containing a maximum of about 50 to 55 percent phosphorus trioxide. The phosphorus trioxide produced according to the process of the present invention is obtained in about 70 to 90 percent yield and of approximately 95 to 100 percent, and generally of 99 percent purity. This process thus achieves not only a high yield and an excellent purity of this trivalent phosphorus anhydride yet at the same time uses commonly available raw materials, namely, phosphorus pentoxide, carbon monoxide and a plasma-forming gas such as argon or helium.

The following examples are illustrative of the present invention and they are not intended in any way to limit the full scope of the invention as described herein.

EXAMPLES

Apparatus

The experimental apparatus comprised a phosphorus pentoxide vaporizer, a reaction zone heated by a plasma-jet generator, a quench chamber, and a system for separating and collecting the phosphorus trioxide formed.

The plasma-jet reactor used in heating the reaction zone was a conventional plasma-jet generator (Thermal Dynamics Model U–51N) employing a water-cooled tungsten cathode centered in a cylindrical water-cooled copper anode having an exit diameter of 0.312 inches. The plasma-jet generator was operated by applying a direct current voltage of 20 volts to the terminals of the plasma-jet generator. Argon was used to generate the plasma flame for heating the reaction zone. The plasma-forming gas was passed between the anode and cathode through a water-cooled stainless steel constriction nozzle to form the plasma flame in the reaction zone. Electrical equipment for providing the voltage input and for monitoring the power input and voltage potential to the terminals of the plasma-jet reactor were a Miller rectified power supply, a Miller high-frequency unit, and various standard electrical control instruments.

The phosphorus pentoxide vaporizer was a cylindrical glass vessel, 6 inches long and 2 inches in outside diameter, which was wrapped with a resistance heating coil and surrounded by asbestos insulation. Connections of the vaporizer to the constriction nozzle in the reaction zone were made by means of a glass-to-metal seal and standard ⅛-inch-outside-diameter copper tubing. The connection from the phosphorus pentoxide vaporizer to the reaction zone was wrapped with a resistance wire for heating the connection electrically and insulated with asbestos.

The reaction zone comprised a vertically oriented cylindrical steel chamber 2 inches long and having an inside diameter of 0.5 inches. An opening at the top of the reaction zone was used to introduce the plasma flame from the constriction nozzle. An opening in the side of the reaction zone above the constriction nozzle allowed the introduction of the carbon monoxide and phosphorus pentoxide reactant mixture. An exit at the bottom of the reaction zone permitted the passing of the gas mixture from the reaction zone into the quench chamber. The reaction zone was jacketed for cooling with water.

The quench chamber, attached to an exit at the bottom of the reaction zone, consisted of three water-cooled copper tubular sections, each 2 inches in length and having an inside diameter of 0.5 inch. An exit tube from the quench chamber passed into a separation and recovery system comprising a glass wool packed column and a cold trap colled with a dry ice-acetone slurry.

The phosphorus pentoxide vaporizer, the reaction zone, the quench chamber and the system for separating and collecting the phosphorus trioxide were connected in a manner which resulted in the experimental apparatus being closed to the atmosphere.

General Operating Procedure

Solid phosphorus pentoxide was placed in a phosphorus pentoxide vaporizer through a ground glass fitting. The vaporizer was then heated to a temperature of 550°–570° K. Carbon monoxide gas was introduced into the vaporizer through a ground glass fitting. The phosphorus pentoxide and carbon monoxide mixture was passed from the phosphorus pentoxide vaporizer through the constriction nozzle and in the reaction zone. An argon plasma flame was generated and constricted to a ⅛-inch-diameter cross section by passage of the plasma flame from the plasma jet generator through the stainless steel constriction nozzle into the reaction zone. The gas mixture from the reaction zone was quenched by passing the gas stream from the reaction zone into the quench chamber at 620° K.

The phosphorus trioxide in the effluent gas stream from the quench chamber was purified by means of a series of collection traps. Phosphorus pentoxide and any other solid materials were separated from the gas stream from the quench chamber by passing the gas mixture from the quench chamber through a glass column, 2 inches in inside diameter and 12 inches long containing a packing of glass wool.

The gas from the glass wool column containing phosphorus trioxide, carbon monoxide, carbon dioxide and argon was passed from the glass wool column through a dry-ice-acetone cold trap where the phosphorus trioxide was condensed. The gas from the dry-ice-acetone cold trap was then vented through a filter column containing wet filter paper and subsequently through a water bubbler to recover an phosphorus trioxide not collected by the cold trap.

The progress of the reaction was followed by sampling the gas from the quench chamber and analyzing it e.g., for carbon dioxide, using gas chromatography. A Beckman GC–1 gas chromatograph containing either a silica gel or a molecular sieve column was used for analysis.

EXAMPLE I

Preparation of Phosphorus Trioxide

Phosphorus pentoxide (200-gram charge) was placed in the phosphorus pentoxide vaporizer. The phosphorus pentoxide vaporizer was connected to the source of carbon monoxide and to the rest of the system comprising the plasma-jet generator, the reaction zone, the quench chamber and the phosphorus trioxide collection and separation system. The entire system was first purged with argon. The phosphorus pentoxide vaporizer was heated to approximately 550° to 570° K. The feed lines from the phosphorus pentoxide vaporizer to the inlet to the reaction zone were heated to a temperature approximately 20°–50° K. higher than that used in the phosphorus pentoxide vaporizer to prevent condensation of phosphorus pentoxide vapor and subsequent clogging of the line to the reaction zone.

After the temperature in the phosphorus pentoxide feed system was stabilized and an argon feed rate of 242 standard cubic feet per minute per square foot of reaction zone cross-sectional area, measured using a conventional gas flowmeter, was established the plasma flame was initiated by applying a DC voltage potential of 20 volts to the terminals of the plasma-jet generator. The plasma-jet generator was allowed to operate for several minutes before the phosphorus pentoxide vapor/carbon monoxide feed was started. The phosphorus pentoxide vapor was fed into the reaction zone by passing carbon monoxide, heated to approximately the same temperature as the phosphorus pentoxide vaporizer (at a flow rate of 36 standard cubic feet per minute per foot of reaction zone cross-sectional area measured using a conventional gas flowmeter), through the phosphorus pentoxide vaporizer and into the reaction zone. The run was continued for 36 minutes with 2.35 grams (0.0083 mole) of phosphorus pentoxide total being passed (determined by measuring the loss in weight of phosphorus pentoxide from the vaporizer during the run) through the reaction zone in a molar ratio of carbon monoxide to phosphorus pentoxide of 25.3. The gas from the reaction zone containing the phosphorus trioxide was passed into the quench chamber at a temperature of about 675° K. The cooled gas from the quench chamber then passed into the gas collection and separation system.

The reaction course during the 36-minute run was followed by analyzing samples of the effluent gas from the quench chamber using gas chromatograph. With the oxidation of carbon monoxide to carbon dioxide, a determination of the carbon monoxide and carbon dioxide concentration in the gas was used to determine the course of the reaction.

The gas from the quench chamber was passed through the glass wool filter column and the phosphorus trioxide condensed in the dry-ice/acetone cold trap. The phosphorus trioxide was then removed from the cold trap. The various pieces of gas collection equipment were washed with deionized water and the washings collected. The wash solutions were analyzed by chemical methods to determine the trivalent phosphorus ($P_4O_6$) content. Total phosphorus determinations were made by acid-base titrations to pH 4.5 according to the method described by Jones and Swift in *Anal. Chem.* 25, 1272-4 (1953). The phosphorus trioxide obtained, e.g., the amount collected in the cold trap and the amount analyzed in the wash solutions as phosphorus trioxide, resulted in a yield of 53.7 percent (adjusted to reflect the amount of phosphorus pentoxide recovered). The phosphorus trioxide was subsequently identified by a freezing point determination and by nuclear magnetic resonance analysis. These analyses indicated that the samples were phosphorus trioxide of greater than 99 percent purity.

A number of additional runs (examples 2–10) were made using the procedure described above in which phosphorus trioxide was prepared from phosphorus pentoxide and carbon monoxide using an argon plasma flame in which the total weight of phosphorus pentoxide fed, the run time and the mole ratio of carbon monoxide to phosphorus pentoxide used were varied. These results, in which phosphorus pentoxide was converted by reaction with carbon monoxide, in the manner described above, to phosphorus trioxide, are summarized in the following table.

PREPARATION OF PHOSPHORUS TRIOXIDE

| Example No. | Argon rate (s.c.f.m.f.) [1] | CO rate (s.c.f.m.f.) | Total weight of $P_4O_{10}$ fed (g.) | Run time (min.) | Mole ratio $CO:P_4O_{10}$ | Yield of anhydride of trivalent phosphorus percent |
|---|---|---|---|---|---|---|
| 2 | 242 | 36 | 6.90 | 66.5 | 28.6 | 78.0 |
| 3 | 242 | 36 | 13.70 | 22.0 | 5.3 | 83.6 |
| 4 | 242 | 36 | 12.10 | 19.0 | 5.2 | 80.7 |
| 5 | 242 | 36 | 7.80 | 30.0 | 12.7 | 89.2 |
| 6 | 242 | 36 | 11.80 | 10.0 | 2.9 | 62.8 |
| 7 | 242 | 36 | 31.30 | 44.0 | 4.6 | 76.4 |
| 8 | 242 | 36 | 7.30 | 16.0 | 7.2 | 82.5 |
| 9 | 242 | 36 | 14.30 | 35.0 | 8.1 | 62.4 |
| 10 | 242 | 36 | 31.50 | 76.0 | 8.0 | 89.8 |

[1] Standard cubic feet per minute per square foot of reaction zone cross section area.

The results shown in the above table summarizing nine additional preparations of phosphorus pentoxide (examples 2–10) demonstrate that phosphorus trioxide is formed from phosphorus pentoxide and carbon monoxide by the process of this invention.

Generally, high conversions of phosphorus pentoxide to phosphorus trioxide were obtained in all examples. Several preparations showed conversions of phosphorus pentoxide to phosphorus trioxide in excess of 80 percent (examples 3, 4, 5, 8 and 10). The average conversion rate for examples 1–10 was 74 percent. The phosphorus trioxide produced in the above examples was about 99 percent pure. Similar results are also obtained when in the above helium is substituted on an equivalent basis for the argon as the plasma-forming gas in that phosphorus trioxide is prepared.

What is claimed is:

1. A process for the preparation of an anhydride of trivalent phosphorus which comprises passing an anhydride of pentavalent phosphorus and carbon monoxide through a reaction zone heated with an inert gas plasma flame to a temperature of from 1,500° to 20,000° K. and into a reaction quench chamber at a temperature of less than 800° K., said inert gas being selected from the group consisting of argon and helium.

2. The process of claim 1 wherein the reaction zone is at a temperature of 3,000° to 12,000° K.

3. The process of claim 2 wherein the temperature of the quench chamber is less than 500° K.

4. The process of claim 2 wherein the molar ratio of anhydride of pentavalent phosphorus to carbon monoxide ranges from 1:4 to 1:30.

5. The process of claim 4 wherein the molar ratio of anhydride of pentavalent phosphorus to carbon monoxide ranges from 1:4 to 1:10.

6. The process of claim 5 wherein the inert gas is argon.

7. The process of claim 6 wherein the process is operated at a pressure of from 0.5 atmosphere to 100 atmosphere.

8. The process of claim 7 wherein the inert gas plasma flame is generated by passing the inert gas through a plasma-jet generator at a flow rate of from 50 to 1,000 standard cubic feet per minute per square foot of reaction zone cross-sectional area.

9. A process for the preparation of an anhydride of trivalent phosphorus which comprises:
   1. contacting an anhydride of pentavalent phosphorus with carbon monoxide in a reaction zone, said reaction zone being heated to a temperature of from 1,500° to 20,000° K. with an inert gas plasma flame, said inert gas being selected from the group selected of argon and helium, to form an equilibrium mixture containing an anhydride of trivalent phosphorus;
   2. cooling said equilibrium mixture in a quench chamber at a temperature of less than 800° K. within less than 3 seconds; and
   3. separating the anhydride of trivalent phosphorus from the equilibrium mixture.

10. The process of claim 9 wherein the reaction zone is at a temperature of 3,000° to 12,000° K.

11. The process of claim 10 wherein the temperature of the quench chamber is less than 500° K.

12. The process of claim 11 wherein the inert gas is argon.

13. The process of claim 12 wherein the molar ratio of anhydride of pentavalent phosphorus to carbon monoxide ranges from 1:4 to 1:30.

14. The process of claim 13 wherein the molar ratio of anhydride of pentavalent phosphorus to carbon monoxide ranges from 1:4 to 1:10.

15. The process of claim 14 wherein the process is operated at a pressure of from 0.5 atmosphere to 100 atmospheres.

16. The process of claim 15 wherein the inert gas plasma flame is generated by passing the inert gas through a plasma-jet generator at a flow rate equal to from 50 to 1,000 standard cubic feet per minute per square foot of reaction zone cross-sectional area.